US006336096B1

(12) United States Patent
Jernberg

(10) Patent No.: US 6,336,096 B1
(45) Date of Patent: Jan. 1, 2002

(54) SYSTEM AND METHOD FOR EVALUATING LIABILITY

(76) Inventor: Donald V. Jernberg, 905 N. Carlyle, Arlington Heights, IL (US) 60004

( * ) Notice: Subject to any disclaimer, the term of this patent is extended or adjusted under 35 U.S.C. 154(b) by 0 days.

(21) Appl. No.: 09/169,424

(22) Filed: Oct. 9, 1998

(51) Int. Cl.$^7$ ................................................ G06F 17/60
(52) U.S. Cl. ........................................... 705/4; 705/1
(58) Field of Search ............................ 705/4, 1, 39

(56) References Cited

U.S. PATENT DOCUMENTS

| | | | | |
|---|---|---|---|---|
| 5,613,072 A | * | 3/1997 | Hammond et al. | 705/4 |
| 5,852,808 A | * | 12/1998 | Cherny | 705/4 |
| 5,870,711 A | * | 2/1999 | Huffman | 705/8 |
| 5,913,198 A | * | 6/1999 | Banks | 705/4 |
| 5,956,687 A | * | 9/1999 | Wamsley et al. | 705/1 |
| 6,019,371 A | * | 2/2000 | Mantis | 273/265 |
| 6,026,364 A | * | 2/2000 | Whitworth | 705/4 |
| 6,253,191 B1 | * | 6/2001 | Hoffman | 705/35 |

FOREIGN PATENT DOCUMENTS

EP          0243035 A2 * 10/1987      ............. G06F/15/30

OTHER PUBLICATIONS

Schoemaker, Paul J.H. et al. "Estimating Environmental Liability," California Management Review. Spring 1995. p. 29.*

Jernberg, Donald V. et al. "Environmental Risk Insurance: Don't Count on It," Risk Management. Jul. 1987. p. 42.*

Gilbert, Evelyn. "Experts Clash on Superfund Reform," National Underwriter. Oct. 28, 1991. p. 3.*

Dauer, Christopher. "Superfund Reform Proposals Pushed," National Underwriter. Sep. 7, 1992. p. 3.*

Jernberg, Donald V. "A Radical Response to the Environmental Litigation Problem," Society of Chartered Property and Casualty Underwriters, CPCU Journal. Sep. 1992. p. 145.*

Doherty, Michael G. "Allocating Progressive Injury Liability Among Successive Insurance Policies," The University of Chicago Law Review. Winter 1997.*

Superfund Web Site. http://www.epa.gov/superfund/.*

Jones, Carol A. "Restoration–Based Compensation Measures in Natural Resource Liability Statutes," Contemporary Economic Policy. Oct. 1997. p. 111.*

Redding, M.J. "Framework for Resolving Hazardous Waste Cleanup Liability," Waste Management '85 Conference: Waste Isolation in the U.S. Technical Programs and Public Education. Mar. 24, 1985.*

Gosline, C.A. et al. "Cost Allocation of Remedial Actions Under Superfund," Hazardous Substances, Mar. 5, 1986.*

* cited by examiner

Primary Examiner—Tariq R. Hafiz
Assistant Examiner—Joe Parisi
(74) Attorney, Agent, or Firm—Fitch, Even, Tabin & Flannery

(57) ABSTRACT

A system and method of evaluating liability among multiple potential responsible parties (PRPs), their insurers and multiple environmental sites supports mediating and arranging settlements in toxic site cleanup between PRPs and insurers, and in appropriate cases, settlements of one or more underlying environmental claims. The system eliminates fragmentation in effecting settlements and handles the interdependence among the parties. According to the system and method, data is gathered, relationships among the data are calculated, a coverage law adjustment factor is applied to the data, allocation and choice of law principles are applied, groupings among the multiple parties and sites are identified based on the apparent settlement potential as identified through the system's various relationships, and a qualitative decision pertaining to the likelihood of outcome is proposed to the parties within the identified groupings.

74 Claims, 6 Drawing Sheets

Fig. 3A

INSUREDS (62)

| Field | Type |
|---|---|
| INSURED ID | TEXT(20) |
| NAME | TEXT(40) |
| AKA | TEXT(40) |
| FKA | TEXT(40) |
| ADDRESS 1 | TEXT(40) |
| ADDRESS 2 | TEXT(40) |
| CITY | TEXT(30) |
| ST | TEXT(2) |
| ZIP | TEXT(10) |
| CONTACT 1 | TEXT(30) |
| TITLE 1 | TEXT(25) |
| PHONE 1 | TEXT(26) |
| FAX 1 | TEXT(20) |
| EMAIL 1 | TEXT(25) |
| NPP | YESNO |
| EDITDATE | DATETIME |
| EDITWHO | TEXT(10) |
| PROVIDEDBY | TEXT(1) |
| RECSTATUS | TEXT(1) |

INSURERS (64)

| Field | Type |
|---|---|
| vcGRID KEYINS | COUNTER |
| INSURERID | TEXT(20) |
| GROUPID | TEXT(20) |
| INSNAME | TEXT(40) |
| DATEREVIEW | DATETIME |
| AKA | TEXT(40) |
| FKA | TEXT(40) |
| ADDRESS 1 | TEXT(40) |
| ADDRESS 2 | TEXT(40) |
| CITY | TEXT(30) |
| ST | TEXT(2) |
| ZIP | TEXT(10) |
| CONTACT1 | TEXT(30) |
| TITLE1 | TEXT(25) |
| PHONE1 | TEXT(26) |
| FAX1 | TEXT(20) |
| EMAIL1 | TEXT(25) |
| NPI | YESNO |
| EDITDATE | DATETIME |
| EDITWHO | TEXT(10) |
| PROVIDEDBY | TEXT(1) |
| RECSTATUS | TEXT(1) |

INSURERGROUPS (66)

| Field | Type |
|---|---|
| INS GROUPID | TEXT(20) |
| GROUPNAME | TEXT(40) |
| AKA | TEXT(40) |
| FKA | TEXT(40) |
| ADDRESS1 | TEXT(40) |
| ADDRESS2 | TEXT(40) |
| CITY | TEXT(30) |
| ST | TEXT(2) |
| ZIP | TEXT(10) |
| CONTACT1 | TEXT(30) |
| TITLE1 | TEXT(25) |
| PHONE1 | TEXT(26) |
| FAX1 | TEXT(20) |
| EMAIL1 | TEXT(25) |
| EDITDATE | DATETIME |
| EDITWHO | TEXT(10) |
| RECSTATUS | TEXT(1) |

GOVTENTITIES (68)

| Field | Type |
|---|---|
| GOVTENTITYID | TEXT(20) |
| NAME | TEXT(40) |
| ADDRESS1 | TEXT(40) |
| ADDRESS2 | TEXT(40) |
| CITY | TEXT(30) |
| ST | TEXT(2) |
| ZIP | TEXT(10) |
| COUNTYREGION | TEXT(25) |
| CONTACT1 | TEXT(25) |
| TITLE1 | TEXT(25) |
| PHONE1 | TEXT(26) |
| FAX1 | TEXT(26) |
| WEBADDRESS | TEXT(60) |
| TYPE | TEXT(15) |
| OTHERINFO | MEMO |
| EDITDATE | DATETIME |
| EDITWHO | TEXT(10) |
| RECSTATUS | TEXT 1) |
| PROVIDEDBY | TEXT(1) |

SITES (70)

| Field | Type |
|---|---|
| SITEID | TEXT(20) |
| SITENAME | TEXT(40) |
| AKA | TEXT(40) |
| FKA | TEXT(40) |
| ADDRESS1 | TEXT(40) |
| ADDRESS2 | TEXT(40) |
| CITY | TEXT(30) |
| ST | TEXT(2) |
| ZIP | TEXT(10) |
| COUNTY | TEXT(30) |
| SITETYPE | TEXT(1) |
| DATEFIRSTDISCOVER | DATETIME |
| DATESITECLOSED | DATETIME |
| DATEGOVTHAZARD | DATETIME |
| TOTALREMEDIATION COST | CURRENCY |
| REMEDIATIONCOST SOURCE | TEXT(1) |
| GOVTAGENCYIN CHARGE | TEXT(20) |
| EDITDATE | DATETIME |
| EDITWHO | TEXT(10) |
| PROVIDEDBY | TEXT(1) |
| RECSTATUS | TEXT(1) |

POLICY (72)

| Field | Type |
|---|---|
| POLICYNUM | TEXT(40) |
| INSURERID | TEXT(20) |
| INSUREDID | TEXT(20) |
| STARTDATE | DATETIME |
| ENDDATE | DATETIME |
| POLICYTYPE | TEXT(1) |
| COVERAGELITIGATION | YESNO |
| LIMITORIGINAL OCCURRENCE | CURRENCY |
| LIMITORIGINAL AGGREGATE | CURRENCY |
| LIMITREMAINING AGGREGATE | CURRENCY |
| ATTACHMENTPOINT | CURRENCY |
| IRDENYCOVERAGE | YESNO |
| IRRESERVERIGHTS | YESNO |
| IRPAYDEFENSE | YESNO |
| IRPAYINDEMNITY | YESNO |
| LOSTPOLICY | YESNO |
| NOTINSPARTY | YESNO |
| KNOWNLOSS | YESNO |
| EXHAUSTION | YESNO |
| UNDERWRITEMIS REP | YESNO |
| NOTINSUREDSITE | YESNO |
| CVGLITPENDSTATE | TEXT(2) |
| EDITWHO | TEXT(10) |
| EDITDATE | DATETIME |
| RECSTATUS | TEXT(1) |
| PROVIDEDBY | TEXT(1) |

Fig. 3Ba

INSUREDSITERELATIONSHIP (74)

| Field | Type |
|---|---|
| INSURERID | TEXT(20) |
| INSUREDID | TEXT(20) |
| SITEID | TEXT(20) |
| DATEOFNOTICE | DATETIME |
| INSUREDSTARTATSITE | DATETIME |
| INSUREDENDATSITE | DATETIME |
| INSUREDVOLUMETRICPERC | DOUBLE |
| INSUREDVOLUMETRICPERCSOURCE | TEXT(1) |
| INSUREDALLOCPERC | DOUBLE |
| INSUREDALLOCPERCSOURCE | TEXT(1) |
| INSUREDALLOCSHARELIABILITY | CURRENCY |
| INSUREDALLOCSHARESOURCE | TEXT(1) |
| DEMINIMUS | YESNO |
| RECSTATUS | TEXT(1) |
| EDITDATE | DATETIME |
| EDITWHO | TEXT(10) |

PRPSITERELATIONSHIP (76)

| Field | Type |
|---|---|
| PRPSITE ID | TEXT(40) |
| SITEID | TEXT(20) |
| PRPID | TEXT(20) |
| DATEPRPSTART | DATETIME |
| DATEPRPEND | DATETIME |
| DATEOFNOTICE | DATETIME |
| ROLEOWNER | YESNO |
| ROLEWASTEGEN | YESNO |
| ROLETRANSPORTER | YESNO |
| ROLEOPERATOR | YESNO |
| ROLEOTHER | YESNO |
| DEMINIMUS | YESNO |
| PRPVOLUMEPERC | DOUBLE |
| VOLUMEPERCSOURCE | TEXT(1) |
| PRPALLOCATEDPERCENT | DOUBLE |
| ALLOCATEDPERCENTSOURCE | TEXT(1) |
| PRPALLOCSHARELIABILITY | CURRENCY |
| PRPALLOCSHARESOURCE | TEXT(1) |
| RELSITELIABILITYOFFER | CURRENCY |
| PRIORSETTLEMENTAMOUNT | CURRENCY |
| RECSTATUS | TEXT(1) |
| EDITDATE | DATETIME |
| EDITWHO | TEXT(10) |

INSURERSITESETTLEMENTOFFER (78)

| Field | Type |
|---|---|
| INSURERID | TEXT(20) |
| INSUREDID | TEXT(20) |
| SITEID | TEXT(20) |
| MAXPAYMENT | CURRENCY |
| ECLASSSETTLE | YESNO |
| RECSTATUS | TEXT(1) |
| EDITDATE | DATETIME |
| EDITWHO | TEXT(10) |

PRPSITESETTLEDEMAND (80)

| Field | Type |
|---|---|
| PRPID | TEXT(20) |
| SITEID | TEXT(20) |
| INSURERID | TEXT(20) |
| RELEASEDEMAND | CURRENCY |
| ECLASSSETTLE | YESNO |
| RECSTATUS | TEXT(1) |
| EDITDATE | DATETIME |
| EDITWHO | TEXT(10) |

Fig. 3Bb

PRPBUYBACKANDCAPS (82)

| | |
|---|---|
| vcGRIDKEY | COUNTER |
| PRPID | TEXT(20) |
| INSURERID | TEXT(20) |
| BUYBACK | |
| RECONDITION | YESNO |
| PRPDEMAND | |
| BUYBACK | CURRENCY |
| PRPDEMANDCAP | CURRENCY |
| EDITDATE | DATETIME |
| EDITWHO | TEXT 10) |
| RECSTATUS | TEXT(1) |

PRPMEDIATIONINSURERS (86)

| | |
|---|---|
| PRPIDCODE | TEXT(20) |
| INSURERID | TEXT(20) |
| MEDIATESETTLE | YESNO |
| MEDIATEBUYBACK | YESNO |
| MEDIATECAP | YESNO |
| EDITDATE | DATETIME |
| EDITWHO | TEXT(10) |
| RECSTATUS | TEXT(1) |

POLICYBUYBACK (84)

| | |
|---|---|
| INSURER ID | TEXT(20) |
| INSURED ID | TEXT(20) |
| BUY BACK AMOUNT | CURRRENCY |
| ALTERNATIVES | YESNO |
| PRECONDITION SETTLE | YESNO |
| CONSIDER BUY BACK | YESNO |
| E CLASS MEDIATION | TEXT(1) |
| REC STATUS | TEXT(1) |
| EDIT WHO | TEXT(10) |
| EDIT DATE | DATETIME |

STATES (88)

| | |
|---|---|
| STATE | TEXT(2) |
| ADJUSTMENT FACTOR | DOUBLE |

PRPMEDIATIONSITES (90)

| | |
|---|---|
| vcGRIDKEY | COUNTER |
| PRPID | TEXT(20) |
| INSURERID | TEXT(20) |
| SITESETTLEMENT | YESNO |
| BUYBACK | YESNO |
| EDITDATE | DATETIME |
| EDITWHO | TEXT(10) |
| RECSTATUS | TEXT(1) |

| Fig. 3B | |
|---|---|
| Fig. 3Ba | |
| Fig. 3Bb | |

Fig. 3C

FIELDLOOKUP (92)

| | |
|---|---|
| DATABASE | TEXT(25) |
| TABLE | TEXT(25) |
| FIELD | TEXT(30) |
| FIELDSIZE | LONGINTEGER |
| TYPE | TEXT(50) |
| ORDINALPOSITION | INTEGER |
| DEFAULTVALUE | TEXT(50) |
| FORMNAME | TEXT(50) |
| CONTROLNAME | TEXT(50) |
| RECORDSET | TEXT(50) |
| COMMENT | TEXT(50) |
| TOOLTIPTEXT | TEXT(50) |

SYSCODES (94)

| | |
|---|---|
| GROUP1 | TEXT(50) |
| GROUP2 | TEXT(50) |
| GROUP3 | TEXT(50) |
| GROUP4 | TEXT(50) |
| GROUP5 | TEXT(50) |
| GROUP6 | TEXT(50) |
| EFF_DATE | DATETIME |
| EXP_DATE | DATETIME |

SYSTEM AND METHOD FOR EVALUATING LIABILITY

BACKGROUND OF THE INVENTION

This invention relates to a system and method for evaluating liability and settlement opportunities, and more particularly, to a system and method for concurrently evaluating environmental liability and settlement opportunities among multiple potential responsible parties (PRPs) and multiple insurers at multiple environmental sites.

This invention also relates to a system and method for evaluating how an aggregate insurance premium may be allocated among multiple PRPs and their insurers when insurance is used to transfer risk at an environmental site.

An environmental site (site) is a location where an environmental event has occurred resulting in liability to one or more parties as a result of such parties' actions at the location. Environmental sites frequently arise after disposal of hazardous substance by multiple parties over numerous years. The Government established Superfund legislation which made all parties who contributed or transported waste to the site and all owners and operators jointly and severally liable for the cost of cleaning up the site. Superfund legislation creates a very complex situation for allocating liability and settling claims among often hundreds or thousands of parties at a single site, each of which may be seeking some insurance coverage under multiple policies from different insurers. Many state environmental cleanup laws follow the federal model.

Pursuant to authority granted under Superfund, or equivalent state laws, the Environmental Protection Agency ("EPA") can force site cleanup. Because the EPA is not required to allocate liability and the joint and several nature of the imposed liability, it is usually left to the multiple PRPs to divide and allocate total costs. The funding of the cleanup costs is further complicated by demands by many PRPs for contribution from different and often numerous insurers. The obligation of insurers to contribute can vary greatly depending on what state law applies. The willingness or ability of PRPs to resolve their differences may depend on the extent to which the numerous insurers agree to contribute.

Environmental and related insurance coverage claims have generated an enormous amount of litigation. Such litigation is often complex and difficult to settle. However, even the successful resolution of a claim of a single PRP against its multiple insurers still leaves unresolved the allocation issues between that single PRP and the multiple other PRPs at the site. Indeed, the fact that a single PRP's issue of relative liability in respect of other PRPs at a site is unresolved often impedes the resolution of the single PRP's claim with its insurers. As the liability horizon is expanded beyond a single site to multiple sites, the entire complexity increases accordingly.

The fragmented, yet interdependent, nature of the liability structure, the importance of differing state insurance coverage law and the large number of sites make traditional claims resolution processes slow, inefficient and costly. A study of major insurers revealed that eighty-eight percent (88%) of their total dollars for environmental claims was being spent on transactional (claims processing and evaluation) costs.

Settlement is further complicated in cases where there are large numbers of small or "de minimis" PRPs, i.e., parties having minimal contact with the environmental site. For example, in a battery reclamation operation a service station owners collect old batteries and deliver them to a reclamation facility. Literally, many hundreds of small companies may have delivered minimal waste to the site. The entire pool of such PRPs may have only a small portion of the total liability. For example, 1200 PRPs may be identified as having involvement at a site, where 1000 of the 1200 contribute only to 5 percent of the total pollution.

To facilitate settlement, the Government may offer the small PRPs the opportunity to settle for a de minimis amount, say $25,000. While often a nominal amount, the de minimis settlement offer is often twice as high as the party's volumetric share of the cleanup costs. Not all of the small POPs may accept the offer, indeed often many do not. Those that do not accept the de minimis settlement are then included with the remaining 100, complicating final settlement. The parties having substantial liability may wish to seek contribution from the non-settling de minimis PRPs. However, litigation against a large number of small parties with small liability can be expensive.

Many de minimis PRPs also have insurance coverage for their liability. The insurance coverage claims for these de minimis claims have the same degree of complexity, but the relatively small dollars at issue for each individual party makes the traditional claims resolution process inefficient and disproportionately costly.

There is a need for a system and method of concurrently evaluating liability among multiple PRPs and their insurers which can facilitate a qualitative determination of likelihood of outcome to all parties. There is a need for a system and method of efficiently obtaining from large numbers of interdependent parties their realistic settlement positions and then evaluating these offers of settlement among multiple insureds and insurers to facilitate a qualitative determination of likelihood of outcome to all parties. These is a need for a system and method which incorporates an independent state law adjustment factor and an objective, independent and legally based means of allocation of liability among insurers of a PRP in order to facilitate a qualitative determination of likelihood of outcome to all parties. There is a need for a system and method to review and evaluate simultaneously the positions of multiple parties and multiple sites so as to provide a qualitative likelihood of outcome that addresses the fragmented and interdependent nature of the underlying environmental remediation liability cleanup scheme.

The risk of liability that all PRPs or a significant group of PRPs (and their insurers) have with respect to a given site can be insured. Such insurance can both reduce total costs to the parties and bring finality and certainty to the involved PRPs and their insurers. However, a critical and difficult step in obtaining such insurance is the agreement of a sufficient number of PRPs to transfer their risk through the purchase of insurance. This may require that each PRP obtain contribution under some number of past insurance policies. There is a need to efficiently assemble the contribution from multiple PRPs to pay the aggregate premium for insurance which will assume the aggregate liability of the covered multiple PRPs at an environmental site. There is also a need for a method to evaluate the proportionate share of the aggregate premium contribution for each of the multiple PRPs to be covered by such insurance.

SUMMARY OF THE INVENTION

A system and method of evaluating liability among multiple potential responsible parties (PRPs) and their insurers relating to multiple environmental sites according to the invention supports mediating and arranging settlements of environmental cleanup liability between PRPs and insurers and in appropriate cases between multiple PRPs. The system resolves, addresses and handles fragmentation in effecting settlements and handles the interdependence among the parties. According to the system and method, data is gathered, relationships among the data are calculated, the allocation of liability among a PRP and its multiple insurers is evaluated and a state adjustment factor is applied to the data. Deviations from a consistent independently determined expected outcome is calculated ("normal value"), and a qualitative decision pertaining to the likelihood of outcome is proposed to the parties.

While the system and method for evaluating liability may be used by anyone, it is anticipated that only independent third parties will use the system and method. The system and method depend upon the parties having environmental liability providing their confidential settlement data. While it is certainly possible that the parties may be willing and agree to provide their confidential information to another party to the environmental liability, it is believed to be less likely to occur. Thus, in the description of the system and method of evaluating liability, the user of the system and method is sometimes referred to as a third party.

Risk data pertaining to multiple PRPs having liability at the environmental site (including the scope and amount of insurance coverage, if any) and settlement data (confidential offers of settlement from insureds and insurers) are obtained. Relationships among the PRPs and insureds are calculated. A legally based allocation methodology and a state adjustment factor, selected on legal choice of law principles, are applied to the relationship data. Anticipated liability data is calculated. A qualitative decision pertaining to the anticipated liability, or case settlement value, is proposed to the parties. State adjustment factors are provided by an independent third party and are used to adjust the insurer's and PRP's relative shares of liability. An allocation theory or algorithm is applied to determine relative contributions between and among various insurers and the PRP/policyholder. Settlement data is provided to an independent third party in confidence.

Risk data includes liability data for the site.

These data are calculated based on volume of pollutants and dollar amount to clean up the site ("volumetric share of liability"). Risk data may also include assigned exposure amounts not based solely upon volumetric share of waste, such as a specific settlement demand from the Superfund manager ("allocated share of liability").

Probable total insurance coverage for each PRP is calculated for a PRP's liability at each site and for all sites within the system.

Many PRPs may have multiple insurers, covering different periods of risk. Time of risk data and time of insurance coverage data is calculated. Time of risk is the time for which the particular PRP has potential legal liability for events or damage at the environmental site. A PRP's involvement at the site is some period of contact at the site which results in legal liability to the PRP. The actual extent of a PRP's involvement is a factual determination which may depend on the particular theory of law applied. Time of coverage is the time each insurance policy was in effect. The probable allocation of total insurance liability among various insurers for a PRP is calculated. The proportionate share of liability that might be allocated to the PRP and/or to uninsured periods is calculated. The state adjustment factor is applied to this amount and the expected normal liability of each party is calculated (the expected "normal liability").

Settlement data are the insurance companies' offers of settlement and the insured's co-payment offers. This information is provided in confidence to an independent third party (user) and the third party does not divulge the information to either insured (PRP) or its insurers. The settlement data is compared to the risk data and the expected normal liability for each PRP and insurer. A calculation is made to determine absolute and percentage deviation between each party's settlement position (offer or demand) and the expected normal liability of each party. This calculation is used by the third party to determine settlement groupings and priorities. No quantitative results are provided to any party. A qualitative likelihood of outcome is provided to all parties, using both absolute dollar differences in position and the calculated absolute and percentage deviation amounts to arrive at the qualitative evaluation.

This qualitative likelihood of outcome gives each party to the environmental action an integrated result, based on multiple PRPs, multiple insurers and independently calculated expected normal liabilities. The calculations and qualitative analyses may be made across variable groupings of PRPS at a single site, multiple sites and with a single PRP and one or more insurer with respect to one or more sites. Settlements are easier to effect among the parties because all parties are provided with an independently developed qualitative result. The system and method of the present invention eliminate the fragmented solutions of the prior art.

Additionally, the system and method can be modified to include historical data pertaining to similar sites. The system and method can also be applied to subsets of PRPs, for example, all de minimis PRPs. The system and method can be used to evaluate complete environmental liability releases by a PRP for all policies issued by an insurer, including unknown liabilities as at yet unidentified sites.

In another embodiment of the invention, the system and method may be used for efficiently assembling and evaluating the proportionate contributions from multiple parties to pay an aggregate premium for insurance which relieves parties of environmental liability. The method and system can also be employed to allocate the aggregate insurance premium among multiple parties whose environmental liabilities would be covered under, or removed by, the single policy of insurance. The total insurance premium is first allocated to each PRP that would be covered under the policy in proportion to either relative volumetric or allocated share of liability of each PRP in the group. This premium amount is then input into the system of the invention as the PRP's total liability for the site(s) covered. From that point, the system of the invention operates as described herein to determine how the PRP's premium share should be allocated between the PRP and its past insurers who will be relieved of liability exposure through the purchase of the environmental coverage covering a group of PRPs.

The system and method of the invention eliminates the fragmentation on the allocation of an aggregate premium for a single environmental policy which will eliminate or mitigate the liability exposure of multiple parties, including PRPs and their insurers, for a single site or multiple sites. The system and method of the invention also allocates the aggregate premium for such policies of insurance by including an independently determined and consistent state coverage law adjustment factor, selected on alternative choice of law principles, and the use of legal principles used to allocate environmental liabilities between and among a PRP and one or multiple insurers.

BRIEF DESCRIPTION OF THE DRAWINGS

FIGS. 3A–3C list field codes for the databases shown in FIG. 1; and

DETAILED DESCRIPTION OF THE PREFERRED EMBODIMENTS

Figure 1:
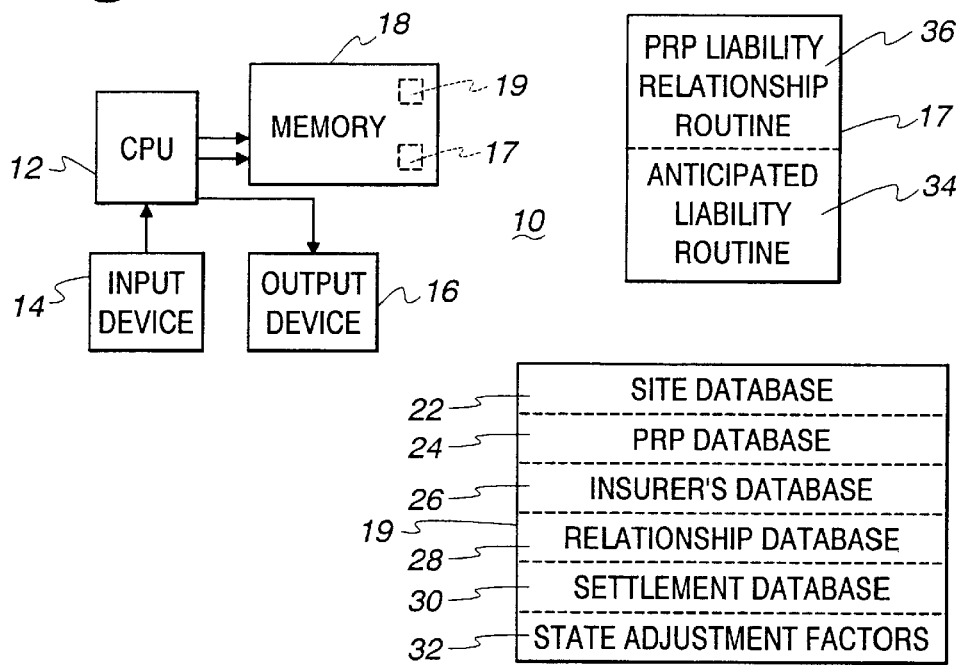
FIG. 1 is a block diagram of a system for evaluating environmental liability among one or more potential responsible parties (PRPs) and multiple insurers at one or more environmental sites according to the present invention.

Referring now to the drawings, and especially to FIGS. 1 and 3A–3C, a system for evaluating environmental liability among multiple potential responsible parties (PRPs) and multiple insurers at multiple sites is generally shown therein and referred to by numeral 10. System 10 includes a central processing unit (CPU) 12 which executes various routines stored in memory location generally designated by 17 in a memory 18. Data pertaining to sites, PRPs and insurers is input via an input device 14 and stored in one or more databases generally designated by 19 in the memory 18.

The use of databases facilitates analysis and manipulation of the data. Input data pertaining to the environmental sites is stored in site database 22. Example elements to be stored in database 22 are shown in Site Field identifier list 70 and GovtEntities Field identifier list 68. Input data pertaining to the PRPs is stored in PRP database 24. Example elements to be stored in database 24 are shown in Insured Field identifier list 62 and Policy Field identifier list 72. Input data pertaining to insurers is stored in Insurer's database 26. Example elements to be stored in database 26 are shown in Insurer Field identifier lists 64 and 66. Settlement data, confidential offers of settlement from both PRPs and Insurers, is stored in Settlement database 30. Example elements to be stored in database 30 are shown in InsurerSiteSettleOffer Field identifier list 78 and PRPSiteSettleDemand Field identifier list 80.

It should be noted that data is shown stored in identified databases. Such designation is done preferably for convenience. Clearly, all data may be stored in a single database or some sub-combination of databases.

A state adjustment factor is a valuation by a person or entity of state law (taking into account statutory law and case law), concerning an insurance company's anticipated liability, relative to its insured (PRP) in pollution remediation suits. A state adjustment factor is a reduction that is applied to the insurer's gross liability to the insured (PRP) and represents the insurer's anticipated contribution considering that state's laws. For example, a state adjustment factor of 0 means the insurer could be expected to pay no portion of the anticipated liability. A state adjustment factor of 30% means the insurer anticipated payment would be 30% of the total liability, or the PRP's liability is expected to be reduced by 30%.

A table of state adjustment factors, determined by the inventor and his expertise in the field of pollution environmental insurance coverage, is listed in Table 1 below. This data is stored in State Adjustment Factors 32 and field identifier list 88 for use by the system 10. The state adjustment factors may be adjusted periodically to reflect changes in state law, to reflect historical evaluations accumulated by the system 10 over time and to reflect identified general consensus among insurers and insureds as to the impact of a particular state's law. The current state adjustment factors are used by the PRP Liability Relationship Routine 36 (described below).

TABLE 1

STATE ADJUSTMENT FACTORS

| State | Adjustment Factor (%) |
|---|---|
| Alaska | 30 |
| Alabama | 75 |
| Arkansas | 50 |
| Arizona | 30 |
| California | 40 |
| Colorado | 75 |
| Connecticut | 35 |
| District of Colombia | 50 |
| Delaware | 15 |
| Florida | 20 |
| Georgia | 85 |
| Hawaii | 50 |
| Iowa | 20 |
| Idaho | 25 |
| Illinois | 75 |
| Indiana | 85 |
| Kansas | 40 |
| Kentucky | 40 |
| Louisiana | 55 |
| Massachusetts | 20 |
| Maryland | 30 |
| Maine | 50 |
| Michigan | 15 |
| Minnesota | 15 |
| Missouri | 50 |
| Mississippi | 75 |
| Montana | 55 |
| North Carolina | 20 |
| North Dakota | 50 |
| Nebraska | 50 |
| New Hampshire | 75 |
| New Jersey | 85 |
| New Mexico | 50 |
| Nevada | 50 |
| New York | 20 |
| Ohio | 15 |
| Oklahoma | 20 |
| Oregon | 25 |
| Pennsylvania | 45 |
| Puerto Rico | 50 |
| Rhode Island | 50 |
| South Carolina | 70 |
| South Dakota | 85 |
| Tennessee | 30 |
| Texas | 55 |
| Utah | 40 |
| Virginia | 45 |
| Vermont | 50 |
| Washington | 85 |
| Wisconsin | 40 |
| West Virginia | 75 |
| Wyoming | 30 |

The PRP Liability Relationship Routine 36 is executed by CPU 12. Data generated as a result of the various calculations performed in the routine are stored in Relationship Database 28. Example elements to be stored in database 28 are shown in Insured Site Relationship Field identifier list 74, PRP Site Relationship Field identifier list 76. Anticipated liability routine 34 is executed by CPU 12 using data stored in the Relationship Database 28 as well as others of the databases. Details of the calculations executed in the PRP Liability Relationship Routine 36 and the Anticipated Liability Routine 34 are set forth below. The Anticipated Liability Routine 34 provides data which can be displayed in various reports or charts. These data are used to assist in the identification of settlement opportunities among the PRPs and insurers at the site(s).

The system 10 can be modified to provide additional relationships pertaining to full environmental claim releases, which include unknown liabilities and/or sites. Example elements to be calculated and stored are shown in PRP Full Environmental Release and Caps list 82, Policy Buy Back list 84, PRP Mediation Insurers list 86, and PRP Mediation Sites 90. Field Lookup List 92 and Syscode List 94 are used by the system 10 to prepare reports.

The system 10 provides for the generation of reports and charts for selectively displaying the collected data and the calculated results of routines 34 and 36, which may be output at output device 16. Output device 16 may be a printer or monitor. Examples of some of preferred reports which may be generated are listed and described below. Reports displaying other combinations of the data and the relationships are clearly possible.

The preferred reports described below list the gathered data and relevant calculations made by the PRP Liability Relationship Routine 36 and the Anticipated Liability Routine 34. Providing relevant data and calculations in a report format as described below assists the user in the identification of settlement opportunities. Once settlement opportunities are identified, a qualitative recommendation can be made to the PRPs and insureds.

Chart No. 1, PRP Site Report/Insurer Settlement (Master Report).

Report 1 evaluates settlement from the perspective of a single PRP at a single site with respect to claims against multiple insurers. It is the base or master report in the system 10. Report 1 accumulates data and calculations which evaluate the PRP's liability in relation to its demands for contribution from its insurers and compares the relative positions of the PRP and its insurers against expected liability outcomes, based on considerations of choice of law, insurance coverage and legal allocation principles.

Chart No. 2(a). Single Site, Multiple PRP Report with De Minimis; Chart No. 2(b) Site Single Aggregate PRP Report without De Minimis.

Reports 2)a)—with De Minimis—and 2)b)—without De Minimis—evaluate the positions of multiple PRPs with respect to a single site. These report also analyze the aggregate position of the multiple insurers of the multiple PRPs in order to provide the overview necessary to evaluate the degree of change in position multiple PRPs may need to make in order to achieve a multi-party site settlement. Report 2)a) adds the position of de minimis parties to the calculation.

Chart No. 3, Single Insurer Site Exposure Analysis.

Report 3 analyzes the insurers exposure with respect to multiple policyholders at a single site. It evaluates the relationship between the individual insurer's deviation and the PRP/Policyholder's total net exposure at the site as a means of evaluating the impact of the change in position by the single insurer in affecting a total settlement between the PRP and all its insurers at the site in question.

Chart No. 4, PRP Multiple site Exposure Report. Report 4 focuses on the PRP's liability exposure at multiple sites. It uses aggregate data relating to insurer settlement positions and deviations from expected liability outcomes. It calculates an aggregate net liability exposure analysis for the PRP at the multiple sites as well as providing an ordering of which sites have the best apparent chance for settlement between the PRP and its insurers.

Chart No. 5, Site Identification Report.

Report 5 is a site settlement identification chart. By rank order, it evaluates the sites having the best opportunity for a multi-party settlement. It uses aggregate PRP and aggregate insurer data to provide the overview. It evaluates which sites the third party settlement evaluator ought to be focusing attention.

Chart No. 6. PRP Site Settlement Analysis.

Report 6 takes the same perspective as Report 1 but reduces the fields to focus on the extent to which the positions of the PRP and its various insurers deviates from expected liability outcome. This facilitates providing qualitative input to the parties relating to their positions.

Chart No. 7, PRP Insurer Settlement Analysis.

Report 7 analyzes the relationship of the position of one PRP with one insurer across multiple sites. The chart analyzes the potential for multi-site claim resolution between the PRP and the one insurer.

Chart No. 8, Insurer PRP Settlement Analysis.

Report 8 evaluates the relationship between a single insurer and multiple policyholders across multiple sites. This analyzes the potential for a multi-site settlement and helps to identify the sites which create the greatest impediment to the parties achieving either a multi-site settlement or a full environmental claim release.

Chart No. 9, Insurer Site Settlement Analysis.

Report 9 analyzes a single insurer's exposure across multiple sites. It evaluates the sites where the insurer has both the greatest and least deviation from expected liability outcomes and where settlement seems most achievable.

Chart No. 10, Single Site Multi-Party Settlement/PRP.

Report 10 analyzes the position of multiple policyholders and the positions of multiple insurers at each site. The chart evaluates the potential for multi-party settlement at a single site and identifies the most significant hurdles to a multi-party settlement at the single site being analyzed.

Chart No. 11, De Minimis Policyholder(PRP)/Insurer Settlement Report (Single Site, Multiple PRPs and Multiple Insurers).

Report 11 analyzes the De Minimis settlement potential at the site. Reflect-ve of the simplified focus of De Minimis settlements, it does not require a period of insured involvement but uses solely insurer's months of coverage, together with the PRP's total cost and the state adjustment factor, to calculate insurer's probable liability outcome and the deviation between that outcome and the offers.

Chart No. 12, De Minimis Aggregate Settlement Summary.

Report 12 aggregates the insurer data for each PRP to reveal the settlement potential for each PRP and for combinations of De Minimis PRPs.

Chart No. 13, De Minimis Settlement Chart. Report 13 is used to calculate the allocation of the final settlement between the PRP and its insurers. The report first allocates to each settling PRP the settlement discount percentage achieved for the group as a whole. Then as between the PRP and its insurers, the settlement is allocated on the ratio of each party's offer to the total of offers from the PRP and all insurers.

Chart No. 14, Full Environmental Release/Cap Analysis.

Report 14 is used to analyze a broad settlement between a PRP and its insurers which includes unknown sites and claims ("Full Environmental Release"). The report calculates and compares the premium that a PRP and insurers assign to the full environmental release compared to the aggregate settlement positions at the known sites. This identifies how the parties are valuing the unknown claim component of the settlement and assists in providing a qualitative assessment of positions.

Sample reports 1–14 displaying the data to be gathered and calculations to be performed by the routine 36 and routine 34 are attached hereto as Appendix 1.

Figure 2:
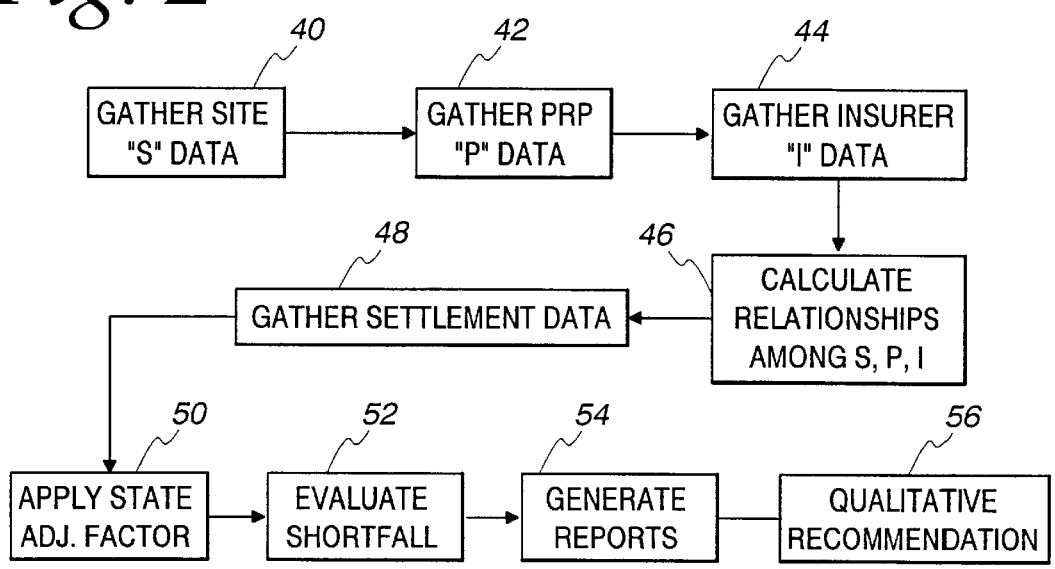
FIG. 2 is a flow chart of a method for evaluating environmental liability among one or more potential responsible parties (PRPs), multiple insurers at one or more environmental sites according to the present invention.

A flow chart of a method for evaluating environmental liability among one or more potential responsible parties (PRPs) and multiple insurers at one or more environmental sites is shown in FIG. 2. The first step in the method is step 40, gather site data. For each site, the following data is typically collected: total estimated site cost (i.e., the total estimated cost to clean up the entire site), the total volume of pollutant to clean up and any non-volumetric allocation of liability. The next step 42 is to gather the PRP data: the volumetric percent of liability, the allocated share (if known) for each potential responsible party (PRP)and the allocation period (i.e., the times the PRP was involved, or subject to legal liability, at the site). In step 44, insurance information is collected for each PRP. For each insurer, the period of coverage, level of policy, dollar amounts of the policy coverage and insurer's position on coverage is gathered.

In step 46, calculations among the Site data, PRP data and Insurer data are performed. These calculations are performed by the PRP Liability Relationship Routine 36. At step 48 settlement data is calculated. Note that all data gathering steps can be accomplished in any order. The only critical element is that data be gathered before it is needed for the particular calculation. At step 50, legal allocation principles are applied to allocate the PRP's liability between the PRP and its various insurers, After determining which state law should be applied, the state adjustment factor for that state is applied to the insurer's and PRP's calculated liability. At step 52, the routine evaluates the shortfall, if any, between the settlement data and the adjusted insurer's liability. These calculations (steps 50 and 52) are made by the Anticipated Liability Routine 34. Deviations from expected liability outcomes are calculated in dollar and in percentage terms.

At step 54 various reports are generated. At step 56, a qualitative recommendation is made to the parties in context of settlement opportunities identified in step 54. A qualitative recommendation consists of a valuation, for example, that one or more parties is closer to the likely liability result.

The reports selected at step 54 depend on the particular settlement issue chosen. For example, the user may choose to analyze the settlement from multiple perspectives: site based, PRP based, insurer based. The various reports provide different calculations of relationships from the three controlling perspectives relating to the settlement of environmental liability and related insurance claims. The user may select any of the above charts to assist in the identification of settlement opportunities. Preferably, if the user wishes to evaluate settlement from the PRP/policyholder's perspective, Reports 1, 6,4 and 7 provide the most useful compilation of liability relationships. If the user wishes to evaluate settlement opportunities from the insurer's perspective, Reports 3, 8 and 9 provide the most useful compilation of liability relationships. If the user wishes to evaluate exposure from a site focus, Reports 10, 2(a) and 2)b) and 5 provide the most useful compilation of data. If the user wishes to evaluate the De Minimis PRPs, Reports 11, 12 and 14 provide the most useful compilation of data.

The various reports generated by system 10 using the databases and the various relationships (routines 36 and 34) evaluated in each are an essential element of the process of overcoming the problem of fragmentation of liability. The composite use of groups of these reports as described above allows the user to more efficiently identify settlement opportunities and, in quantitative terms, to evaluate the extent to which the various multiple parties may need to alter their positions in order to effect broader settlements.

Preferably, no detailed results are presented to the PRPs and the insurers. Indeed, settlement offers and demands are provided to a user of system 10 (who is not a party to the environmental action) under conditions of confidentiality and that it will not be presented to the other parties. Of course, quantitative results may be provided when a settlement is consummated. Interim positions may be disclosed if all parties agree.

In an alternative embodiment of the invention, system 10 can be used to calculate the likely apportionment of a premium for an insurance policy to relieve the liability of a group of the parties (i.e., both PRPs and insurers). Many Superfund cleanups take years to complete, which means many of the PRPs and insurers may face liability in the future. The market is such that an insurance policy can sometimes be purchased covering the present and future liability for the site. Clearly, a premium for such coverage would be large for a single PRP or insurer to pay. Such insurance is generally only purchased when a significant number of PRPs and their insurers agree to participate and share in the premium. The system 10 can be used to allocated the premium among the PRPs and their insurers in the same manner it is used to allocate liability.

The premium for the particular coverage may be allocated to PRPs based on either allocated or volumetric share and the system 10 and method as described above is followed as before to allocate the aggregate premium costs among the PRPs and their insurers. The PRP Liability Relationship routine 36 and Anticipated Liability Routine 34 are used to calculate shortfalls, reports are generated and a qualitative recommendation is provided to the parties regarding contributions of individual parties toward the aggregate premium are made.

Preferably the system 10 runs on a Microsoft Windows 32 bit desktop operating system, including Windows 95 and Windows NT. Any personal computer running either of these operating systems and having at least 20 megabytes of free RAM memory can operate the routines 34 and 36. Preferably two versions of the system 10 will be used. A first version includes all the operating routines for calculating relationships among the data and is intended for a fixed base (headquarters) operation. The headquarters version is used to enter data, perform analysis and create reports. All data with the exception of temporary query data resides on the database server. Reports can be viewable on a monitor screen or sent to any supported Windows printer. An import function will merge field application data into the database server A second (field) version is limited to a subset of the headquarter's data entry forms. The field version is intended for data entry of insurance police, sites insured, sites where responsibility exists, PRP information, etc. The field version includes no analysis functionality and reports are limited to data entered into the appropriate database. Data can be exported to the headquarters version.

PRP Liability Relationship Routine

After data is input into the Site Database 22, PRP Database 24 and Insurer Database 26, the PRP Liability Relationship routine 36 performs various calculations on the data. To perform the PRP Liability Relationship routine 36, variables, or ID's, are assigned to some of input data (or combinations of the input data). Table 2 lists the variable names and definitions which are used by the PRP Liability Relationship routine 36 to perform its calculations. These variables are the same variables used in the formulas shown and used in Reports 1–14.

TABLE 2

DATABASE VARIABLES

| Variable/ReportID | Description | Location |
|---|---|---|
| a | Total Est. Site Costs | Site Cost Estimate, provided by Government or in default by PRP or insurer. Note 1. |
| b | Allocated % (Amount) of PRP Liability | PRP assigned Volume usually includes orphan shares (usually from Govt.). Note 2. |
| c | Volume Percentage | PRP's contribution to total site volume of waste within liability category to which PRP belongs (i.e. owner/operator; generator or arranger) |
| d | Allocated Dollar Amount | PRP's percent of total site costs, usually includes either a premium or orphan share. Can be the non-binding allocation of responsibility ("NBAR") if provided by EPA or State or can be based on other equitable considerations as established by the parties (a × b) |
| e | Volume Dollar Amount | Supplied or calculated: (c × a) |
| f | Allocation Period | Calculate from Site Involvement Data supplied by PRP (e.g., number of months from 1st involvement to 1st discovery) |
| g | State adjustment factor | From Table 1, State based on either location of site or PRP domicile |
| h | Contribution by PRP | PRPs offer from Settlement Database |

Note 1. This amount may be increased to reflect the estimated defense and transactional costs.

Note 2. This amount may be adjusted for estimated defense and transaction costs.

Information is then calculated, some of which is calculated from the individual data on the various databases. Table 3 lists and describes the variable names and formulas (shown in Reports 1–15) which are used to establish the various relationships among the sites, PRPs and their insureds.

TABLE 3

PRP RELATIONSHIP DATA

| Variable/ReportID | Description | Formula-Relationship |
|---|---|---|
| A | Months of coverage | Sum of months of coverage for each insurer per PRP |
| B | Time on Risk (TOR) | Insurer Months = A/(sum of all insurer months + uninsured months)* |
| C | TOR Allocated $ | Product of B and d (Table 2) |
| D | TOR Volume $ | Product of B and e (Table 2) |
| E | Coverage Adjusted Factor | g (Table 2) |
| F | Insurer Adjusted Allocated $ | Product of C and g (Table 2) |
| G | Adjusted Volume $ | Product of D and g (Table 2) |
| H | PRP Base Liability | Greater of D or E |
| I | PRP Accept/Demand | From Settlement Database, list for each insurer, sum = h |
| J | Insurer Offer | From Settlement Database |

*Alternatively, the Time on Risk (TOR) is calculated as the insurer's percentage coverage as the ratio of the insurer's time coverage within the PRP's total period of actual or implied involvement at the site to the PRP's total period of coverage, but assumes for coverage purposes the insured's period of involvement at the site ended with the general introduction of the absolute pollution exclusion in ISO general liability policies on or about January 1, 1986. Alternatively, the PRP's allocated dollar or percentage liability may be calculated as the sum of the PRP's volumetric share and the PRP's allocated share of "orphan shares." Orphan shares are those shares which are assigned to PRPs that cannot be located for payment.

insurer's time coverage within the PRP's total period of actual or implied involvement at the site to the PRP's total period of coverage, but assumes for coverage purposes the insured's period of involvement at the site ended with the general introduction of the absolute pollution exclusion in ISO general liability policies on or about Jan. 1, 1986. Alternatively, the PRP's allocated dollar or percentage liability may be calculated as the sum of the PRP's volumetric share and the PRP's allocated share of "orphan shares." Orphan shares are those shares which are assigned to PRPs that cannot be located for payment.

Anticipated Liability Routine

After data is input into the PRP Liability Relationship database 28, the Anticipated Liability routine 34 performs further calculations on the data. To perform the Anticipated Liability routine 34, variables, or ID's, are assigned to some of input data (or combinations of the input data). Table 4 lists and describes the variable names and formulas (shown in Reports 1–14) which are used which are used by the Anticipated Liability routine 34 to perform its calculations. These data are input into the Settlement database 30.

TABLE 4

ANTICIPATED LIABILITY DATA

| Variable/ReportID | Description | Formula-Relationship |
|---|---|---|
| K | Shortfall | I − J for each Insurer |
| L | Insurer Offer Adjusted Allocated $ Deviation | F − J for each Insurer |
| M | Offer Adjusted Volume Deviation | G − J for each Insurer |
| N | PRP Adjusted Sharer per Insurer | (100% − g) × H × B |
| O | PRP $ Deviation | N − I |
| P | PRP % Deviation | Sum of O divided by Sum of N |
| Q | Insurer % Deviation | L/F |
| R | Insurer Coverage Adjustment Factor | J/C |
| S | Coverage Discount Deviation | R − E or R − g |
| T | PRP Total Exposure | Sum of N + Sum of C for uninsured period |
| U | PRP Under Pay | T − h |

The PRP Under Pay is a measure of the PRP's excess demand from insurers, based upon the system's normalized values. With this number, the user can compare it to the PRP offer and the Insurer's offer to propose a qualitative recommendation. With the insurer dollar and percent deviation numbers, the user can make qualitative recommendations and analyze alternative settlement groupings. The underpay and deviation numbers may also be used value the use of insurance products, and allocation of the premium for such products, as a means of transferring liability and setting the claim.

The process of preparing a qualitative recommendation also involves determining the pairings of PRPs, insurers and sites that are to be included within potential settlement structure. To identify the relationships and pairings, the system 10 generates various reports focusing on different relationships, as previously discussed. The Anticipated Liability data may be evaluated in about ten different contexts as provided by the different reports.

Appendix 2 shows the various data entry boxes (forms), with sample data, used to input data into the system. Shown in appendix 1 are: Select Data Source; Insurer Info; Insurer Groups; Site Data (two views); Policyholder Info; Policy Data; Insured to Site Relationship (three views); Full Environmental Release for all Policies; Policyholder Info; Insurer Info; Site Data (two views); Policyholder to Site Relationship (four views); Policyholder Buy Backs; Policyholder Site Mediation Requests; Government Entities (two views) and State Adjustment Factor (where inputting the state causes the adjustment factor to be displayed).

The system 10 uses a custom record management class. A class is a set of program code (found in many different program languages, such as C++) that performs multiple functions and is designed to be reusable in multiple places throughout a program or programs. It is the basis of an object oriented design, and provides an easy to use interface to its functionality to the software developer.

A class can either model a real world object, such as a customer, or it can model a process, such as moving through a set of files. In system 10, the record management class models the process of moving through a set of file folders (or records). The process of moving through a drawer of file folders includes methods, such as pulling out the file, putting it back, getting the next file, etc. The record management class provides similar functionality, such as MoveNext, MoveLast, etc. The process of using a drawer of files also uses "properties," which are nouns that describe a folder, such as the account name, folder ID number, etc. The record management class has properties such as record number and record set name. The record set is instantiated (used) on every form generated by the program. When a user or the program requires the next record in a table, it uses the same class regardless of which form or module (program code) is in use. The record management class also provides for consistent, effective error checking and formatting of user input. This simplifies the interface, program maintenance and future enhancements.

Figure 4A:
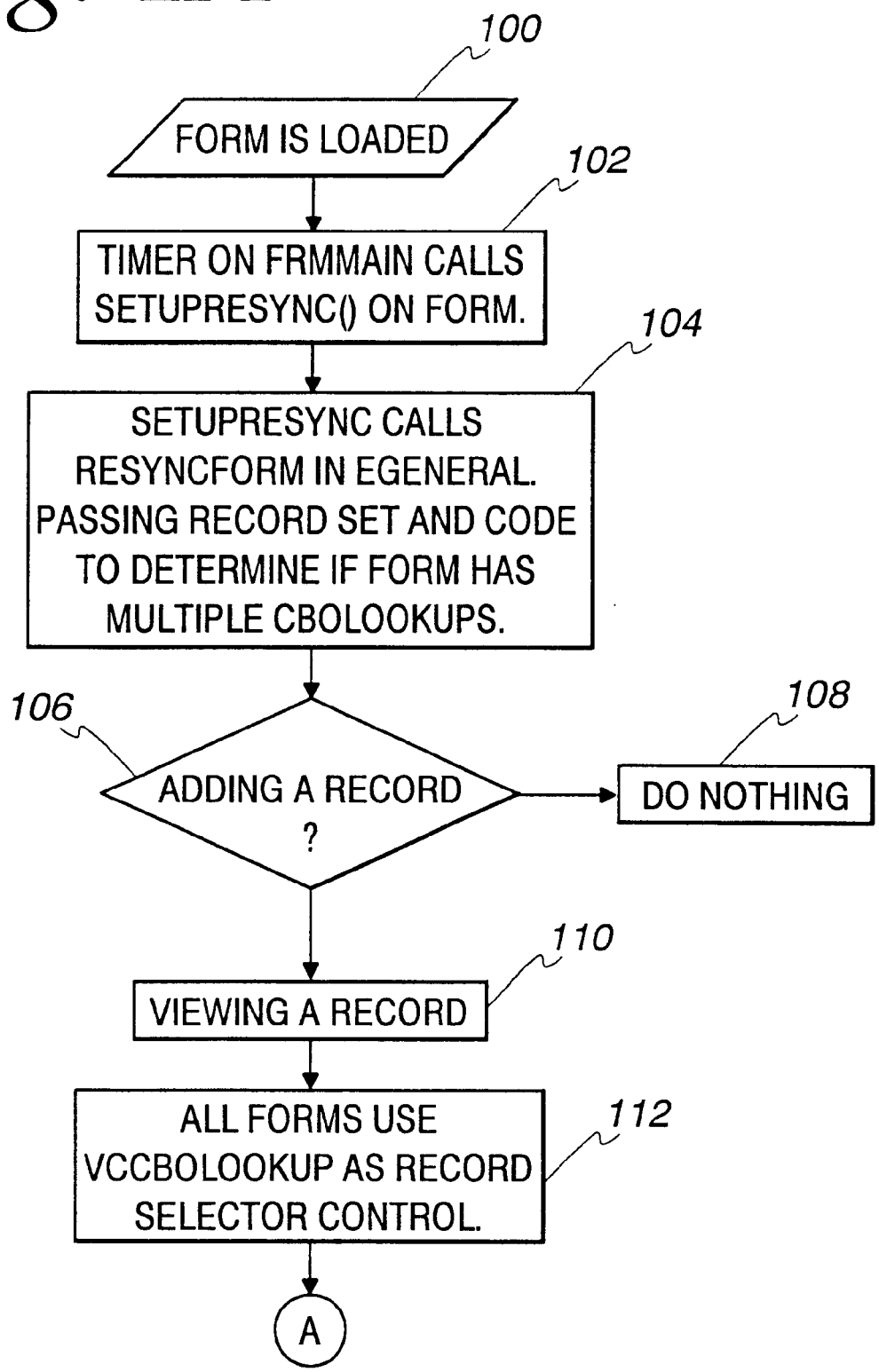
FIGS. 4A–4C are a flow chart of record management flow routine for inputting data in the method of FIG. 2.
Figure 4B:
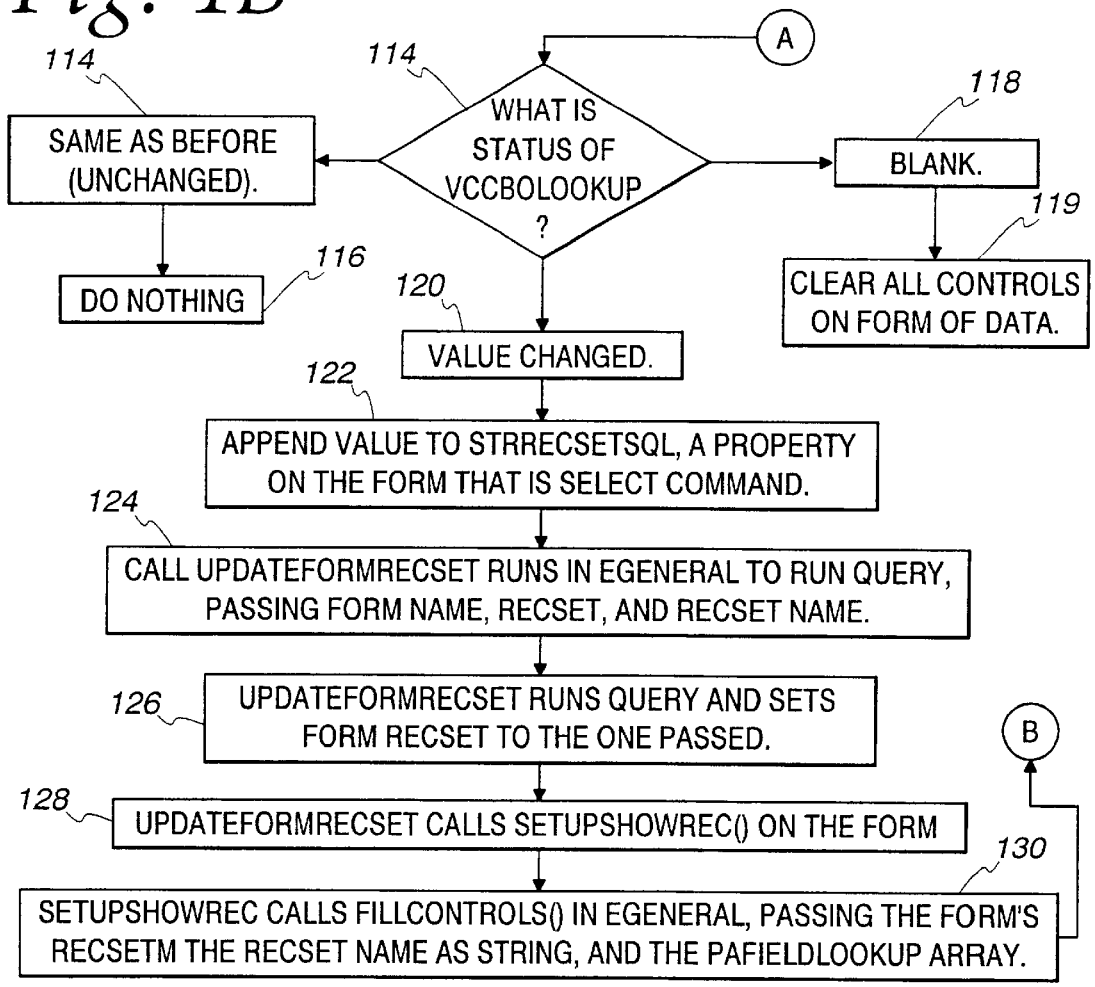
Figure 4C:
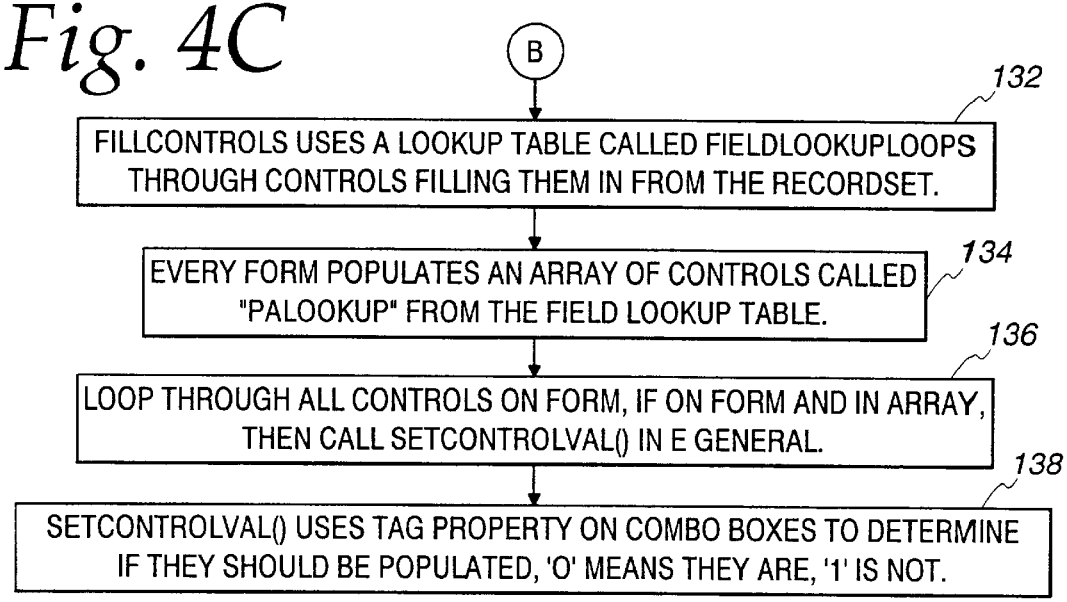

The system 10 includes a record management flow routine for allowing the user to input data using the various input screens shown in Appendix 2. This routine calls the record management class whenever a new record is added. Referring to FIGS. 4A–4C, after the user selects the appropriate form to complete, at block 100 that form is loaded and displayed on the monitor 16 for input. At block 102, the timer on the frmMain routine calls SetupResynco for the form. At block 104 SetupResynco calls ResyncForm to determine if the form has multiple lookups. At block 106, the routine checks if the user is adding a record. If yes, the routine does nothing at block 108. If no, the routine assumes a record is to be viewed at block 110.

At block 112, the routine executes vccboLookup as a record selector control. At block 114, the routine checks the status of vccboLookup. If blank at block 118, the routine clears all controls on the form of data at block 119. If the record is unchanged at block 114, the routine does nothing. If the value in the record has changed at block 120, the routine continues to block 122. At block 122 the routine appends a value to strRecSetSQL, a property on the form that is SELECT command. At block 124, the routine runs a query, passes the form name, RecSet and RecSet name. At block 126, the routine runs the query and sets the form recset to the one passed. At block 128, SetupShowrec is called and displays the form. At block 130, FillControl() is called allowing the user to input the fields on the form At block 132, FillControl() fills in the form At block 134, the routine loads the array of controls, "paLookup," from the field lookup table. At block 136, the routine loops through all the controls. At block 138, the SetControlVal() tags the combination boxes to determine if they should be populated or not.

While there has been illustrated and described a particular embodiment of the present invention, it will be appreciated that numerous changes and modifications will occur to those skilled in the art, and it is intended in the appended claims to cover all those changes and modifications which follow in the true spirit and scope of the present invention.

What is claimed is:

1. Apparatus for evaluating environmental liability among a potentially responsible party (PRP), having a plurality of insurers arising from a legal liability of the PRP at an environmental site, comprising:

a site database which stores data pertaining to an estimated total cost of cleaning up the site;

a PRP database which stores data pertaining to the PRP's allocated amount of liability;

an insurer's database which stores data pertaining to a PRP's time of coverage and limits of liability under a policy with the insurer;

a PRP liability relationship routine for determining a set of liability relationships among the PRP, the insurers and the site;

a PRP liability relationship database which stores PRP liability relationship data resulting from execution of the relationship routine;

a settlement database which stores confidential settlement data of the PRP's and the insurers pertaining to offers of settlement; and an anticipated liability routine for determining an anticipated liability among the PRP and the insurers in response to a state adjustment factor pertaining to an adjustment of an insurer's liability with respect to a coverage obligation based on a selected state's laws and the settlement data and for generating an output based upon the divergence of the adjusted relationship data from the settlement data.

2. The apparatus of claim 1, wherein the state adjustment factor comprises a number from 0 to 100%.

3. The apparatus of claim 1 wherein the site database stores a total anticipated cleanup costs at the site and a period of involvement and wherein the PRP database stores the PRP's percentage of total volume amount of pollution at the site and the PRP's period of involvement at the site.

4. The apparatus of claim 1 wherein the PRP database stores data for a plurality of PRPs.

5. The apparatus of claim 4 wherein at least one of the PRPs comprises a de minimis PRP.

6. The apparatus of claim 1 wherein the insurer database stores data for a single insurer and the PRP database stores data for a plurality of PRPs.

7. The apparatus of claim 3, wherein the relationship routine calculates the PRP's volumetric dollar amount of liability, wherein the PRP's volumetric dollar amount is the product of the PRP's percentage of total volume amount times the total anticipated cleanup costs.

8. The apparatus of claim 7 wherein the relationship routine calculates the PRP's allocated dollar amount of liability, wherein the allocated dollar amount comprises the sum of the PRP's volumetric dollar amount of liability and a proportionate share of uncollectible shares which are allocated among a group of other, remaining PRPs at the site.

9. The apparatus of claim 3, wherein the relationship routine calculates the insurer's percent time on risk (TOR) coverage, wherein the TOR coverage is the ratio of the PRP's time of coverage under a policy with the insurer within the PRP's total period of involvement at the site to the PRP's total period of involvement.

10. The apparatus of claim 9, wherein the relationship routine calculates the TOR allocated dollars, wherein the TOR allocated dollars is the product of the TOR coverage and the PRP's allocated amount of liability.

11. The apparatus of claim 10, wherein the relationship routine calculates the TOR volume dollars for each PRP, wherein the TOR volume dollars is the product of the TOR coverage and the PRP's percentage of total volume amount times the total anticipated cleanup costs.

12. The apparatus of claim 11, wherein the anticipated liability routine calculates the insurer's adjusted allocated dollars, wherein the insurer's adjusted allocated dollars is the product of the TOR allocated dollars times the state adjustment factor.

13. The apparatus of claim 12, wherein the anticipated liability routine calculates the insurer's adjusted volume dollars, wherein the insurer's adjusted volume dollars is the product of the TOR volume dollars times the state adjustment factor.

14. The apparatus of claim 13, wherein the anticipated liability routine compares the greater of the insurer's adjusted allocated dollar amount and the insurer's adjusted volume dollar amount, to the insurer's offer of settlement to generate an output representing an offer adjusted allocated or volumetric dollar deviation.

15. The apparatus of claim 1 further comprising a choice of law routine for determining which state law shall be used in determining which state adjustment factor to apply.

16. The apparatus of claim 14 wherein the PRP's offer to pay toward settlement is subtracted from the product of the greater of the PRPs volumetric or allocated dollar liability times (100% minus the state adjustment factor) to generate an output representing the PRP's adjusted dollar deviation.

17. The apparatus of claim 14 wherein the dollar deviations for each insurer are expressed in percentages by dividing the dollar deviation amount of the insurer by the greater of the adjusted allocated or volumetric dollar amount calculated by the liability routine for each such insurer.

18. The apparatus of claim 16 wherein the PRP's dollar deviations are expressed in percentages by dividing the dollar deviation amount of the PRP by the greater of the adjusted allocated or volumetric dollar amount calculated by the liability routine for the PRP.

19. The apparatus of claim 1 further comprising a routine for allocating liability among multiple insurers of a single PRP/policyholder with respect to an environmental liability which may impact or trigger multiple years of insurance coverage.

20. Apparatus for evaluating environmental liability among a potentially responsible party (PRP), having a plurality of insurers, arising from a legal liability at an environmental site, comprising:

a database which stores data pertaining to an estimated total cost of cleaning up the site, the PRP's allocated amount of liability, for each insurer, the PRP's time of coverage and limits of liability under a policy with the insurer, and confidential settlement data of the PRP and the insurers pertaining to offers of settlement;

a PRP liability relationship routine for determining a set of liability relationships among the PRP, the insurers and the site;

wherein PRP liability relationship data resulting from execution of the relationship routine is stored in the database; and an anticipated liability routine for determining an anticipated liability among the PRP and the insurers, in response to a state adjustment factor pertaining to an adjustment of an insurer's liability with respect to a coverage obligation based on a selected state's laws and the settlement data and for generating an output based upon the divergence of the adjusted relationship data from the settlement data.

21. The apparatus of claim 20, wherein the state adjustment factor comprises a number from 0 to 100%.

22. The apparatus of claim 20 wherein the database stores a total anticipated cleanup costs at the site, a total period of involvement at the site, the PRP's percentage of total volume amount of pollution at the site and the PRP's period of involvement at the site.

23. The apparatus of claim 20 wherein the database stores data for a plurality of PRPs.

24. The apparatus of claim 23 wherein at least one of the PRPs comprises a de minimis PRP.

25. The apparatus of claim 20 wherein the database stores data for a single insurer and data for a plurality of PRPs.

26. The apparatus of claim 22, wherein the relationship routine calculates the PRP's volumetric dollar amount of liability, wherein the PRP's volumetric dollar amount is the product of the PRP's percentage of total volume amount times the total anticipated cleanup costs.

27. The apparatus of claim 26 wherein the relationship routine calculates the PRP's allocated dollar amount of liability, wherein the allocated dollar amount comprises the sum of the PRP's volumetric dollar amount of liability and a proportionate share of uncollectible shares which are allocated among a group of other, remaining PRPs at the site.

28. The apparatus of claim 22, wherein the relationship routine calculates the insurer's percent time on risk (TOR) coverage, wherein the TOR coverage is the ratio of the PRP's time of coverage under a policy with the insurer within the PRP's total period of involvement at the site to the PRP's total period of involvement.

29. The apparatus of claim 28, wherein the relationship routine calculates the TOR allocated dollars, wherein the TOR allocated dollars is the product of the TOR coverage and the product of the PRP's allocated amount of liability.

30. The apparatus of claim 29, wherein the relationship routine calculates the TOR volume dollars for each PRP, wherein the TOR volume dollars is the product of the TOR coverage and the PRP's percentage of total volume amount times the total anticipated cleanup costs.

31. The apparatus of claim 30, wherein the anticipated liability routine calculates the insurer's adjusted allocated dollars, wherein the insurer's adjusted allocated dollars is the product of the TOR allocated dollars times the state adjustment factor.

32. The apparatus of claim 31, wherein the anticipated liability routine calculate the ingurer's adjusted volume dollars, wherein the insurer's adjusted volume dollars is the product of the TOR volume dollars times the state adjustment factor.

33. The apparatus of claim 32, wherein the anticipated liability routine compares the greater of the insurer's adjusted allocated dollars and the insurer's adjusted volume dollars, to the insurer's offer of settlement to generate an output representing an offer adjusted allocated or volumetric dollar deviation.

34. The apparatus of claim 20 further comprising a choice of law routine for determining which state law shall be used in determining which state adjustment factor to apply.

35. The apparatus of claim 33 wherein the PRP's offer to pay toward settlement is subtracted from the product of the greater of the PRPs volumetric or allocated dollar liability times (100% minus the state adjustment factor) to generate an output representing the PRP's adjusted dollar deviation.

36. The apparatus of claim 35 wherein the dollar deviations for each insurer are expressed in percntages by dividing the dollar deviation amount of the insurer by the greater of the adjusted allocated or volumetric dollar amount calculated by the liability routine for each such insurer.

37. The apparatus of claim 35 wherein the PRP's dollar deviations are expressed in percentages by dividing the dollar deviation amount of the PRP by the greater of the adjusted allocated or volumetric dollar amount calculated by the liability routine for the PRP.

38. The apparatus of claim 20 further comprising a routine for allocating liability among multiple insurers of a single PRP/policyholder with respect to an environmental liability which may impact or trigger multiple years of insurance coverage.

39. A method for evaluating environmental liability among a potentially responsible party (PRP), having a plurality of insurers arising from a legal liability at an environmental site; comprising:

gathering site data pertaining to an estimated total cost of cleaning up the site;

gathering PRP data pertaining to the PRP's allocated amount of liability;

gathering insurere's data pertaining to a PRP's time of coverage under a policy with the insurer;

calculating a set of liability relationships among the PRP data, the insurers data and the site data;

gathering confidential settlement data of the PRP and insurers pertaining to offers of settlement; and calculating an anticipated liability among the PRP and the insurers, comprising applying a state adjustment factor, wherein the state adjustment factor corresponds to an adjustment of a PRP's liability with respect to an insurer's obligation based on a state's laws, to the relationship data and comparing the adjusted relationship data with the settlement data.

40. The method of claim 39 further comprising the step of providing a qualitative recommendation of a likelihood of outcome based on the calculated anticipated liability.

41. The method of claim 39 further comprising the step of gathering data pertaining to a total anticipated cleanup costs at the site, a total period of involvement at the site, the PRP's percentage of total value amount of pollution at the site and the PRP's period of involvement at the site.

42. The method of claim 39 further comprising the step of applying the liability relationships and the anticipated liability among the PRP's and the insurers to calculate an anticipated allocation of an insurance premium for an insurance policy covering the anticipated liability.

43. The method of claim 41 further comprising the step of calculating the PRP's volumetric dollar amount of liability, wherein the PRP's volumetric dollar amount is the product of the PRP's percentage of total volume amount times the total anticipated cleanup costs.

44. The method of claim 43 further comprising the step of calculating the PRP's allocated dollar amount of liability, wherein the allocated dollar amount comprises summing the PRP's volumetric dollar amount of liability and a proportionate share of uncollectible shares which are allocated among a group of other, remaining PRPs at the site.

45. The method of claim 44 further comprising the step of calculating the insurer's percent time on risk (TOR) coverage, wherein the TOR coverage is the ratio of the PRP's time coverage under a policy with the insurer within the PRP's total period of involvement at the site to the PRP's total period of involvement.

46. The method of claim 45 further comprising the step of calculating the TOR allocated dollars, wherein the TOR allocated dollars is the product of the TOR coverage and the product of the PRP's allocated amount of liability times the estimated total cost.

47. The method of claim 46 further comprising the step of calculating the TOR volume dollars for each PRP, wherein the TOR volume dollars is the product of the TOR coverage and the PRP's volumetric dollar amount.

48. The method of claim 47 further comprising the step of calculating the insurer's adjusted allocated dollars, wherein the insurer's adjusted allocated dollars is the product of the TOR allocated dollars times the state adjustment factor.

49. The method of claim 48 further comprising the step of calculating the insurer's adjusted volume dollars, wherein the insurer's adjusted volume dollars is the product of the TOR volume dollars times the state adjustment factor.

50. The method of claim 49 further comprising the step of comparing the greater of the insurer's adjusted allocated dollar amount and the insurer's adjusted volume dollar amount, to the insurer's offer of settlement to generate an output representing an offer adjusted allocated or volumetric dollar deviation.

51. The method of claim 39 further comprising the step of determining which state law shall be used in determining which state adjustment factor to apply.

52. The method of claim 50 further comprising the step of subtracting the PRP's offer to pay toward settlement from the product of the greater of the PRPs volumetric or allocated dollar liability times (100% minus the state adjustment factor) and generating an output representing the PRP's adjusted dollar deviation.

53. The method of claim 52 further comprising the step of expressing the insurer's dollar deviation in percentages by dividing the dollar deviation amount of the insurer by the greater of the adjusted allocated or volumetric dollar amount calculated by the liability routine for each such insurer.

54. The method of claim 53 further comprising the step of expressing the PRP's dollar deviations in percentages by dividing the dollar deviation amount of the PRP by the greater of the adjusted allocated or volumetric dollar amount calculated by the liability routine for the PRP.

55. The method of claim 39 further comprising the step of allocating liability among multiple insurers of a single PRP/policyholder with respect to an environmental liability which may impact or trigger multiple years of insurance coverage.

56. Apparatus for evaluating environmental liability among a potentially responsible party (PRP), having a plurality of insurers, arising from a legal liability at an environmental site, comprising:

a database which stores data pertaining to an estimated total cost of cleaning up the site, the PRP's allocated amount of liability, for each insurer, the PRP's time of coverage and limits of liability under a policy with the insurer, and confidential settlement data of the PRP and the insurers pertaining to offers of settlement;

a PRP liability relationship routine for determining a set of liability relationships among the PRP, the insurers and the site;

wherein PRP liability relationship data resulting from execution of the relationship routine is stored in the database;

an anticipated liability routine for determining an anticipated liability among the PRP and the insurers, in response to a state adjustment factor pertaining to an adjustment of an insurer's liability with respect to a coverage obligation based on a selected state's laws and the settlement data and for generating an output based upon the divergence of the adjusted relationship data from the settlement data; and a computer having a CPU for executing the PRP liability relationship routine and the anticipated liability routine and a memory for storing the database.

57. The apparatus of claim 56, wherein the state adjustment factor comprises a number from 0 to 100%.

58. The apparatus of claim 56 wherein the database stores a total anticipated cleanup costs at the site, a total period of involvement at the site, the PRP's percentage of total volume amount of pollution at the site and the PRP's period of involvement at the site.

59. The apparatus of claim 56 wherein the database stores data for a plurality of PRPs.

60. The apparatus of claim 58 wherein at least one of the PRPs comprises a de minimis PRP.

61. The apparatus of claim 56 wherein the database stores data for a single insurer and data for a plurality of PRPs.

62. The apparatus of claim 58, wherein the relationship routine calculates the PRP's volumetric dollar amount of liability, wherein the PRP's volumetric dollar amount is the product of the PRP's percentage of total volume amount times the total anticipated cleanup costs.

63. The apparatus of claim 62 wherein the relationship routine calculates the PRP's allocated dollar amount of liability, wherein the allocated dollar amount comprises the sum of the PRP's volumetric dollar amount of liability and a proportionate share of uncollectible shares which are allocated among a group of other, remaining PRPs at the site.

64. The apparatus of claim 63, wherein the relationship routine calculates the insurer's percent time on risk (TOR) coverage, wherein the TOR coverage is the ratio of the PRP's time of coverage under a policy with the insurer within the PRP's total period of involvement at the site to the PRP's total period of involvement.

65. The apparatus of claim 64, wherein the relationship routine calculates the TOR allocated dollars, wherein the TOR allocated dollars is the product of the TOR coverage and the product of the PRP's allocated amount of liability.

66. The apparatus of claim 65, wherein the relationship routine calculates the TOR volume dollars for each PRP, wherein the TOR volume dollars is the product of the TOR coverage and the PRP's volumetric dollar amount.

67. The apparatus of claim 66, wherein the anticipated liability routine calculates the insurer's adjusted allocated dollars, wherein the insurer's adjusted allocated dollars is the product of the TOR allocated dollars times the state adjustment factor.

68. The apparatus of claim 67, wherein the anticipated liability routine calculates the insurer's adjusted volume dollars, wherein the insurer's adjusted volume dollars is the product of the TOR volume dollars times the state adjustment factor.

69. The apparatus of claim 68, wherein the anticipated liability routine compares the greater of the insurer's adjusted allocated dollar amount and the insurer's adjusted volume dollar amount, to the insurer's offer of settlement to generate an output representing an offer adjusted allocated or volumetric dollar deviation.

70. The apparatus of claim 56 further comprising a choice of law routine for determining which state law shall be used in determining which state adjustment factor to apply.

71. The apparatus of claim 69 wherein the PRP's offer to pay toward settlement is subtracted from the product of the greater of the PRPs volumetric or allocated dollar liability times (100% minus the state adjustment factor) to generate an output representing the PRP's adjusted dollar deviation.

72. The apparatus of claim 71 wherein the dollar deviations for each insurer are expressed in percentages by dividing the dollar deviation amount of the insurer by the greater of the adjusted allocated or volumetric dollar amount calculated by the liability routine for each such insurer.

73. The apparatus of claim 72 wherein the PRP's dollar deviations are expressed in percentages by dividing the dollar deviation amount of the PRP by the greater of the adjusted allocated or volumetric dollar amount calculated by the liability routine for the PRP.

74. The apparatus of claim 56 further comprising a routine for allocating liability among multiple insurers of a single PRP/policyholder with respect to an environmental liability which may impact or trigger multiple years of insurance coverage.

* * * * *